J. P. JOHNSON.
WATERPROOF SELF LUBRICATING BEARING FOR PROPELLER SHAFTS, &c.
APPLICATION FILED OCT. 22, 1914.

1,153,624.

Patented Sept. 14, 1915.

WITNESSES:
W. K. Ford
James P. Barry

INVENTOR
Jeremiah P. Johnson.
BY
ATTORNEYS

UNITED STATES PATENT OFFICE.

JEREMIAH P. JOHNSON, OF DETROIT, MICHIGAN.

WATERPROOF SELF-LUBRICATING BEARING FOR PROPELLER-SHAFTS, &c.

1,153,624.

Specification of Letters Patent.

Patented Sept. 14, 1915.

Application filed October 22, 1914. Serial No. 868,024.

*To all whom it may concern:*

Be it known that I, JEREMIAH P. JOHNSON, a citizen of the United States of America, residing at Detroit, in the county of Wayne and State of Michigan, have invented certain new and useful Improvements in Waterproof Self-Lubricating Bearings for Propeller-Shafts, &c., of which the following is a specification, reference being had therein to the accompanying drawings.

The invention relates to bearings for propeller shafts of boats and for similar uses where it is desirable to obtain a construction which is free from friction and is also liquid-tight.

The invention comprises the novel construction as hereinafter set forth.

Figure 1:
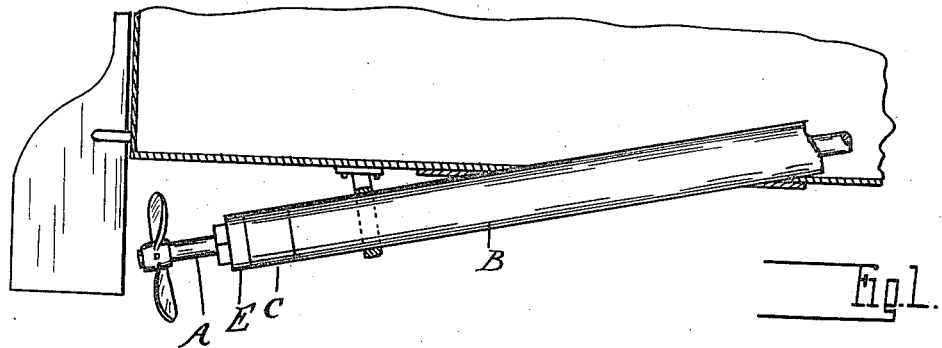
Figure 2:
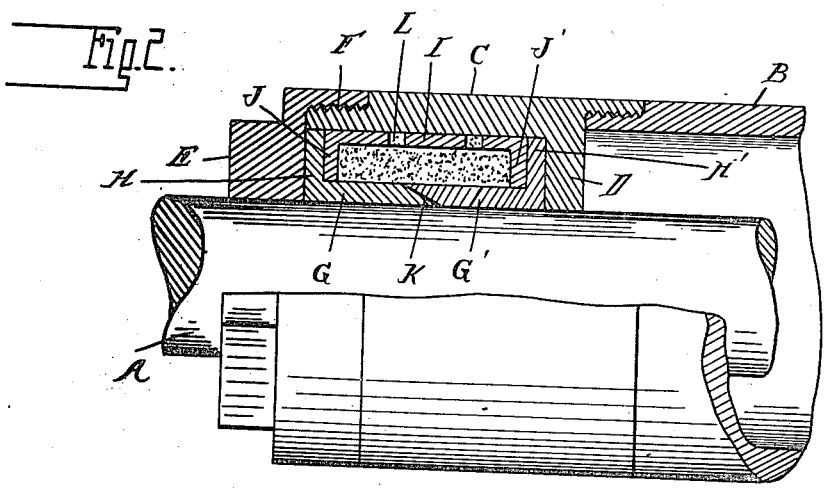

In the drawings: Figure 1 is a sectional elevation showing the bearing as applied to the propeller shaft of a boat; Fig. 2 is a section partly in elevation through the bearing.

A is the shaft, B is a housing for inclosing the shaft and C is my improved bearing which, as shown, is applied to the outer end of the housing. The bearing C comprises a casing having a portion D fitting the shaft and a recessed portion providing a chamber surrounding the shaft. At the opposite end of this casing is a cap member E preferably having a threaded engagement F therewith, said member also bearing upon the shaft A and closing the recessed portion. Within the recess is arranged a sectional sleeve member G G' having outwardly-extending flanges H H', the sleeve closely fitting the shaft and the flanges fitting the opposite ends of the recess in the casing. There is also a member I fitting the outer wall of the recess and having inwardly-extending flanges J and J' adjacent to the flanges H and H'. The construction is such that the parts may be assembled by slipping the sleeve members G G' into the opposite ends of the member I, and thereby inclosing an annular space which may be filled with a suitable plastic lubricant.

The joint between the sleeve sections G and G' is preferably formed by tapering the end of one and flaring the end of the other, as shown at K, thereby forming a restricted passage through which the lubricant may be fed from the recess to the bearing on the shaft. The member I is also provided with one or more apertures L for allowing the lubricant to pass outward into the crevices between said member and the casing C.

With the construction as described in assembling the parts the member I is filled with the lubricant, the sleeve members G G' inserted in position, and the said parts are then sleeved upon the shaft A and inserted in the recess in the member C. The cap E is then secured in position and will hold the inner parts from displacement. In operation the water which leaks through the cap member E will press against the lubricant in the recess within the inner members and by its pressure will fill the space between the shafts and the sleeves with the lubricant which will seal the joint. At the same time the shaft is free to revolve without the frictional resistance which is always introduced where a packing gland is employed.

What I claim as my invention is:—

1. A shaft bearing, comprising a member having a portion bearing upon the shaft and a recessed portion, a detachable cap for closing said recess and also bearing upon said shaft, a sleeve within said recess having outwardly-extending flanges at the opposite ends thereof, and a coöperating member fitting the outer wall of the recess provided with inwardly-extending flanges, said members constituting a recess for containing the lubricant.

2. A shaft bearing, comprising a recessed member having a portion bearing upon the shaft, a cap for closing said recess and also bearing upon the shaft, and sections within said recess for lining the same and containing lubricant.

3. A shaft bearing, comprising a recessed member having a portion bearing on said shaft, a cap for closing the recess and also bearing upon the shaft, and an inner assembly comprising members respectively fitting the shaft and outer wall of the recess, having oppositely-extending overlapping flanges at their ends and the space within said members being filled with lubricant.

4. A shaft bearing, comprising a recessed member having a portion bearing upon the shaft, a cap for closing said recess and also bearing upon the shaft, a pair of sleeves having a tapering engagement with each other and at their opposite ends outwardly-extending flanges for fitting within the recess, and a member fitting the outer wall of the recess having inwardly-extending flanges overlapping the flanges of said sleeves, the space between said member and sleeves being filled with lubricant.

In testimony whereof I affix my signature in presence of two witnesses.

JEREMIAH P. JOHNSON.

Witnesses:
 THOS. JOHNSON,
 JOSEPH CHAMBERS.